(12) United States Patent
Yokota

(10) Patent No.: US 7,375,858 B2
(45) Date of Patent: May 20, 2008

(54) IMAGE DATA CONTROL APPARATUS AND METHOD FOR IMAGE-RECORDING DEVICE

(75) Inventor: Kenji Yokota, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 986 days.

(21) Appl. No.: 10/386,721

(22) Filed: Mar. 13, 2003

(65) Prior Publication Data

US 2003/0179414 A1    Sep. 25, 2003

(30) Foreign Application Priority Data

Mar. 19, 2002    (JP) .............................. 2002-075873

(51) Int. Cl.
*B41C 1/02*    (2006.01)

(52) U.S. Cl. .................... 358/3.29; 347/225; 347/248; 347/264; 430/270.1; 430/300; 430/301; 430/302

(58) Field of Classification Search ............... 358/1.15, 358/302, 3.29; 347/225, 248, 264; 430/270.1, 430/300, 301, 302; 219/121.6; 101/401.1, 101/477

See application file for complete search history.

(56) References Cited

U.S. PATENT DOCUMENTS

| | | | |
|---|---|---|---|
| 3,558,813 A | 1/1971 | Barkman et al. | |
| 4,642,680 A | 2/1987 | Yamada | |
| 5,200,837 A | 4/1993 | Sakurai | |
| 5,347,368 A | 9/1994 | Mochizuki | |
| 5,576,144 A * | 11/1996 | Pearce et al. | 430/270.15 |
| 6,293,657 B1 * | 9/2001 | Garcia et al. | 347/84 |
| 6,421,110 B1 * | 7/2002 | Yakawa | 355/41 |
| 6,911,300 B2 * | 6/2005 | Sato et al. | 430/307 |
| 2002/0063887 A1 * | 5/2002 | White | 358/1.15 |

FOREIGN PATENT DOCUMENTS

| | | |
|---|---|---|
| EP | 0750417 A | 12/1996 |
| EP | 0922573 A | 6/1999 |
| JP | 06-130677 | 5/1994 |
| JP | 2001-246735 | 9/2001 |
| JP | 2001-270070 | 10/2001 |
| WO | 0580394 A | 1/1997 |
| WO | WO 97/13354 A | 4/1997 |

* cited by examiner

Primary Examiner—Twyler Lamb
Assistant Examiner—Vu Hang
(74) Attorney, Agent, or Firm—Margaret A. Burke; Sheldon J. Moss

(57) ABSTRACT

Ablation data of a region other than an image region, which ablation data is required for a positive-type printing plate, is added at a printing plate automatic exposure device side. Thus, a disadvantage of a time duration for transmission of job data from a PC being slowed because of the ablation data is solved. As a result, image recording operations can be made more efficient. Furthermore, the ablation data includes non-exposure portions at regions corresponding to peripheral edge portions of the printing plate. Consequently, light does not impinge on a leading end chuck, a trailing end chuck and the like, and the ablation data can be made suitable for interlaced scanning.

10 Claims, 7 Drawing Sheets

F I G. 1
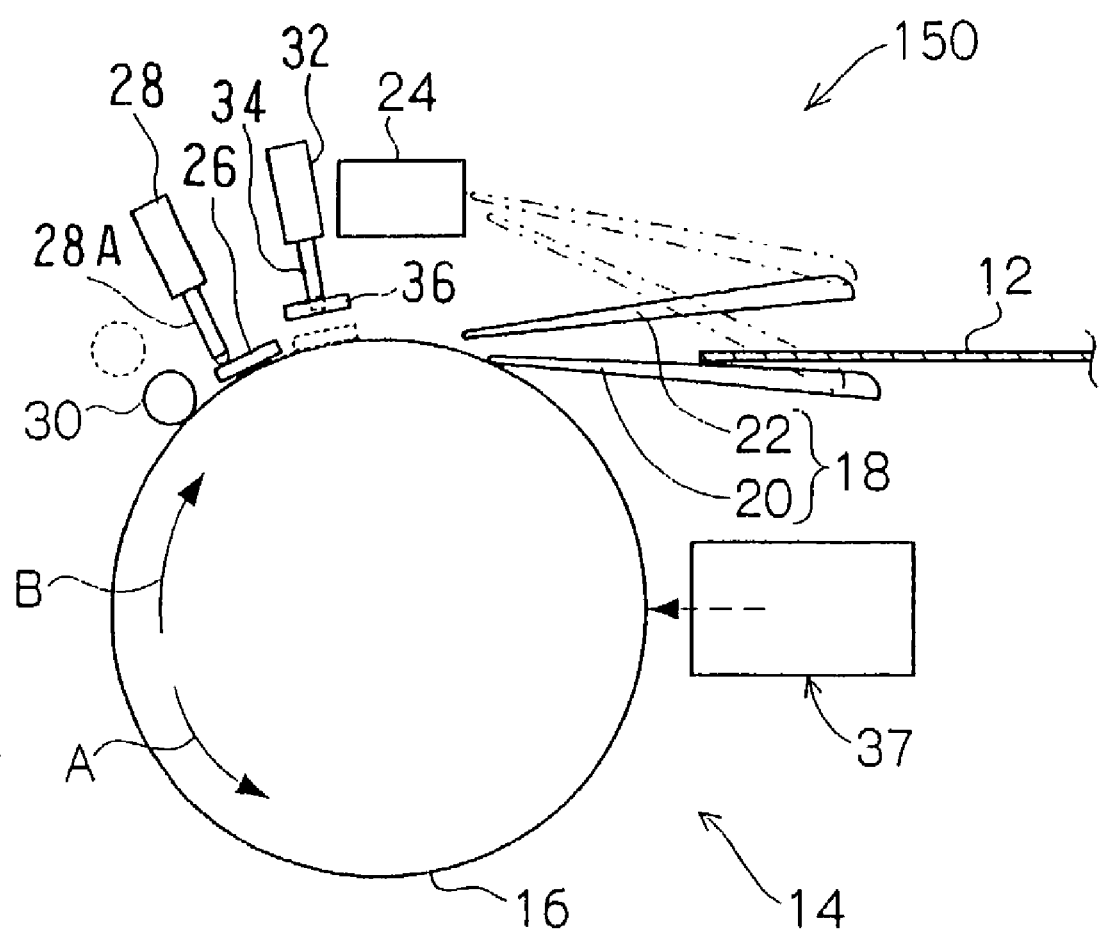

IMAGE DATA CONTROL APPARATUS AND METHOD FOR IMAGE-RECORDING DEVICE

BACKGROUND OF THE INVENTION

1. Field of the Invention

The present invention relates to an image data control apparatus employed at an image-recording device which forms an image on a recording medium on the basis of image data from an external device.

2. Description of the Related Art

In conventional image-recording devices, development of technologies (printing plate exposure devices) which employ a sheet-form recording material, particularly a printing plate in which a photosensitive layer is provided on a support, and record an image on the photosensitive layer (an emulsion layer) of the printing plate with a direct laser beam or the like, by moving a recording head in an axial direction of a rotating drum (sub-scanning) while the rotating drum is rotated at high speed (main scanning) in a state in which the printing plate has been wound on a peripheral surface of the rotating drum, has been progressing. With such technologies, rapid recording of images onto printing plates is enabled.

At a time of image recording, the rotating drum is rotated using a servo motor, and rotation thereof is controlled. Image data is transmitted to the recording head synchronously with the rotation of the rotating drum.

Image data of an image to be recorded at such an image-recording device is received from an external control device such as a personal computer (below referred to as a "PC") or the like. At this time, if the printing plate is of a positive type, it is necessary to append ablation data at an outer periphery of an image region, such that ink will not be applied at the outer periphery. Because the ablation data is a "solid" image, an increase in data volume results when the ablation data is to be created at the PC and transmitted to the image-recording device. This increase in data volume causes a reduction in image data transmission rates, resulting in adverse effects on overall operational efficiency of the image recording.

Furthermore, regardless of the kind of a printing plate (negative type or positive type), cases may arise in which, depending on a base color of a recording medium (printed matter) which is to be printed by the printing plate, it is necessary to append a predetermined color at a region other than the image region. In such a case, data for this color is transmitted from the PC, and the burden thereof is great.

SUMMARY OF THE INVENTION

In consideration of the circumstances described above, an object of the present invention is to provide an image data control apparatus for an image-recording device, which apparatus is capable of improving a transmission rate of image data and preventing a reduction in operational characteristics of image recording at a positive-type recording medium that requires color data, particularly ablation data, at surroundings of an image.

A first aspect of the present invention is an image data control apparatus to be employed at an image-recording device which forms an image on a recording medium on the basis of image data from an external device, the image data control apparatus for the image-recording device including: a judgment section which judges whether the recording medium is a negative type or a positive type; an image region identification section which, in a case in which the judgment section judges that the recording medium is a positive type, identifies an image region on the recording medium on the basis of the image data from the external device; and an ablation data addition section, which adds ablation data to the image data for ablation of a region on the recording medium other than the image region identified at the image region identification section.

According to the first aspect to the present invention, if the judgment section judges that a recording material is a positive type, an image region on the recording material is distinguished on the basis of the image data corresponding to that recording material, and ablation data for a region other than the identified image region is appended (by the ablation data addition section). As a result, the image data from the external device is only the original image data, and the occurrence of slowing in transmission of the image data will not occur even with a positive-type recording material.

A second aspect of the present invention is the first aspect, in which the ablation data is provided with a non-exposure portion at a portion corresponding to a peripheral edge region of the recording medium.

There are cases in which a peripheral edge of the recording material is provided with, for example, a chuck margin for attachment of a chuck for retaining the recording material, or the like. If there is ablation data at a region formed by this chuck margin, the chuck itself will be exposed with light, and there is a possibility that the chuck itself may be damaged or that diffused reflections may occur.

Furthermore, in a case in which interlaced scanning is employed as an image-recording technique, there are regions at which complete scanning is not possible, at times of an initial scan and a final scan. Thus, even if provision of data thereat is desired, such provision is physically impractical. If ablation data is appended at such a region, a stripe-form irregularity will occur, and data conflicts will occur.

Accordingly, the disadvantages described above can be solved by providing unexposed regions in accordance with portions corresponding to peripheral edges of the recording material.

According to the second embodiment of the present invention, when ablation data is to be appended, a non-exposed portion is provided at the portion corresponding to the peripheral edge region of the recording material. Thus, for example, the aforementioned irradiation of exposure light onto a chuck, the occurrence of irregularities, and discrepancies in data can be prevented.

A third aspect of the present invention is an image data control apparatus to be employed at an image-recording device which forms an image on a recording medium on the basis of image data from an external device, the image data control apparatus for the image-recording device including a predetermined-color data addition section, which adds predetermined-color data to the image data for coloring a region on the recording medium other than an image recording region with a predetermined color, wherein the predetermined-color data is provided with a non-exposure portion at a portion corresponding to a peripheral edge region of the recording medium.

A fourth aspect of the present invention is the third aspect, in which the predetermined-color data includes ablation data.

According to the third aspect of the present invention, regardless of the type of a recording material, an image region on the recording material is distinguished on the basis of the image data corresponding to that recording material, and data of a predetermined color is appended at a region other than the identified image region (by the predetermined-color data addition section). Consequently, if, for example, the recording material is a positive-type recording material, "solid" image data (the ablation data of the fourth aspect) is appended to serve as the predetermined-color data at the region other than the image region. As a result, the image data from the external device is only the original image data, and the occurrence of slowing in transmission of the image data will not occur.

Furthermore, if the recording material is a negative-type recording material, white data (equivalent to no data) is appended at the region other than the image region, to serve as the predetermined-color data. Specifically, if the base color of the recording material is white, there is no data, and thus there is no need to prepare the data.

However, if the base color of the recording material is a color other than white and it is desired that the region other than the image region should be white, or if it is desired that the region of the recording material other than the image region should be some desired color, data therefor may be appended.

Incidentally, there are cases in which a peripheral edge of the recording material is provided with, for example, a chuck margin for attachment of a chuck for retaining the recording material, or the like. If predetermined-color data is present at a region formed by this chuck margin, the chuck itself will be exposed with light, and there is a possibility that the chuck itself may be damaged or that diffused reflections may occur.

Furthermore, in cases in which interlaced scanning is employed as an image-recording technique, there are regions at which complete scanning is not possible, at times of an initial scan and a final scan. Thus, even if provision of predetermined-color data thereat is desired, such provision is physically impracticable. If predetermined-color data is appended at such a region, a stripe-form irregularity will occur, and discrepancies with respect to the data will occur.

Accordingly, the disadvantages described above can be solved by providing unexposed regions in accordance with portions corresponding to peripheral edges of the recording material.

Further, a fifth aspect of the present invention is an image data control method to be employed at an image-recording device, the method comprising the steps of: determining whether or not job data has been inputted; compressing the image data in a predetermined compression format and storing the compressed image data at a buffer memory; decompressing the compressed image data and converting the decompressed image data to line image data; extracting description information in the job data and achieving settings for both hardware and software on the basis of this extracted information; determining from the extracted description information whether or not the printing plate is of a positive type and if this judgment is positive, then determining that ablation data will be required and generating ablation data on the basis of the image data; forming non-exposure regions at peripheral edge portions of the printing plate in the generated ablation data and adding the ablation data featuring the unexposed portions to the line image data; arranging the line image data into swath units according to the format of main scanning of the image-recording device and storing the line image data at the respective line buffers; and executing image processing on the basis of one-swath units of image data, when line image data in an amount corresponding to three swaths is sorted out.

BRIEF DESCRIPTION OF THE DRAWINGS

FIG. 1 is a schematic diagram of a printing plate automatic exposure device relating to a present embodiment.

DESCRIPTION OF THE PREFERRED EMBODIMENTS

Figure 2:
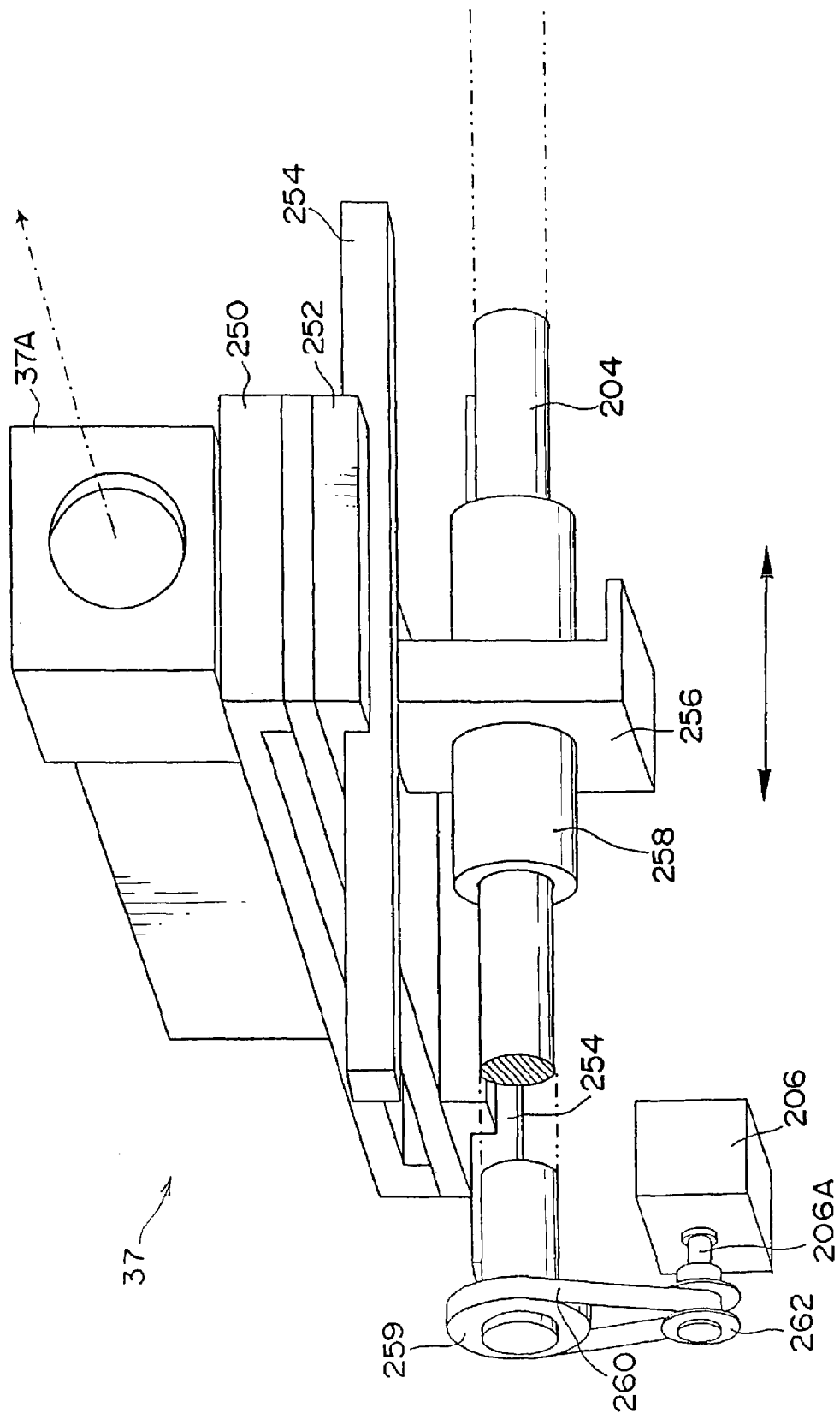
FIG. 2 is a perspective view showing schematics of a recording head.

Herebelow, general structure of a printing plate automatic exposure device 150, which is employed as an image-recording device, is illustrated.

As shown in FIG. 1, an exposure section 14 of the printing plate automatic exposure device 150 is structured with a rotating drum 16, which retains a printing plate 12 wound onto a peripheral surface thereof, as a principal component. The printing plate 12 is guided by a conveyance guide unit 18 and fed in from a tangential direction of the rotating drum 16.

A puncher 24 is disposed upward of the rotating drum 16 in FIG. 1.

The conveyance guide unit 18 is structured with a plate supply guide 20 and a plate ejection guide 22.

A positional relationship of the plate supply guide 20 and plate ejection guide 22 of the conveyance guide unit 18 relative to one another is set to a horizontal V shape, and the plate supply guide 20 and plate ejection guide 22 are structured to rotate through a predetermined angle about a center of rotation which is at the right end side of FIG. 1. Consequent to this rotation, the plate supply guide 20 and plate ejection guide 22 can be made to selectively correspond with the rotating drum 16 or the puncher 24.

The printing plate 12 is first guided by the plate supply guide 20 and fed into the puncher 24, and a cut-out for positioning is formed at a leading end of the printing plate 12.

After processing by the puncher 24, the printing plate 12 is temporarily returned to the plate supply guide 20, and moved to a position corresponding with the rotating drum 16.

The rotating drum 16 is rotated by unillustrated driving means in a direction for loading and exposing the printing plate 12 (the direction of arrow A in FIG. 1) and a direction of removing the printing plate 12 (the direction of arrow B in FIG. 1), which is a direction opposite to the loading/exposing direction.

As shown in FIG. 1, a leading end chuck 26 is attached to the rotating drum 16 provided at the exposure section 14, at a predetermined position of the outer peripheral surface. When the printing plate 12 is to be loaded at the rotating drum 16, first, the rotating drum 16 is stopped with the leading end chuck 26 at a position facing a leading end of the printing plate 12 which is being fed in by the plate supply guide 20 of the conveyance guide unit 18 (a printing plate loading position).

In the exposure section 14, a mounting unit 28 is provided facing the leading end chuck 26 at the printing plate loading position. When one end side of the leading end chuck 26 is pushed by extension of an extending/contracting rod 28A of the mounting unit 28, insertion of the printing plate 12 between the leading end chuck 26 and the peripheral surface of the rotating drum 16 becomes possible.

In a state in which the leading end of the printing plate 12 has been inserted between the leading end chuck 26 and the rotating drum 16, the extending/contracting rod 28A of the mounting unit 28 is drawn back and pressure on the leading end chuck 26 is released. Consequently, the leading end of the printing plate 12 is sandwiched between the leading end chuck 26 and the peripheral surface of the rotating drum 16, and retained.

At this time, the leading end of the printing plate 12 is abutted against positioning pins (not shown), which are provided at the rotating drum 16. Thus, the printing plate 12 is positioned.

When the leading end of the printing plate 12 has been fixed at the rotating drum 16, the rotating drum 16 rotates in the loading/exposing direction (the direction of arrow A in FIG. 1). Consequently, the printing plate 12 being fed from the plate supply guide 20 of the conveyance guide unit 18 is wound on the peripheral surface of the rotating drum 16.

A squeeze roller 30 is disposed in a vicinity of the peripheral surface of the rotating drum 16, at a downstream side in the loading/exposing direction from the printing plate loading position. The squeeze roller 30 pushes the printing plate 12 being wound on the rotating drum 16 toward the rotating drum 16 by moving toward the rotating drum 16, and closely contacts the printing plate 12 with the peripheral surface of the rotating drum 16.

A trailing end chuck attaching/removing unit 32 is disposed in a vicinity upstream from the squeeze roller 30 with respect to the loading/exposing direction of the rotating drum 16. At the trailing end chuck attaching/removing unit 32, a trailing end chuck 36 is mounted at a distal end of a shaft 34, which protrudes towards the rotating drum 16.

When a trailing end of the printing plate 12 wound onto the rotating drum 16 opposes the trailing end chuck attaching/removing unit 32, the shaft 34 is projected and the trailing end chuck 36 is mounted at a predetermined position of the rotating drum 16. Consequently, the trailing end chuck 36 sandwiches and retains the trailing end of the printing plate 12 between the trailing end chuck 36 and the rotating drum 16.

When the leading end and trailing end of the printing plate 12 are retained at the rotating drum 16, the squeeze roller 30 is moved away. Thereafter, the rotating drum 16 is rapidly rotated at a predetermined rotation speed (main scanning) and, synchronously with this rotation of the rotating drum 16, a light beam modulated on the basis of image data is irradiated from a recording head section 37.

FIG. 2 shows general structure of the recording head section 37. A recording head main body 37A of the recording head section 37 is supported at a base portion 250. The base portion 250 is mounted on a sliding base 252, which is a sliding body which structures a ball-screw mechanism. Consequently, the recording head main body 37A moves with the sliding base 252.

The sliding base 252 is guided in the axial direction of the rotating drum 16 (see FIG. 1), along two mutually parallel rails 254. A connecting portion 256 for connecting the sliding base 252 with a shaft 204 of the ball-screw mechanism is attached at a lower portion of the sliding base 252.

A tube portion 258 is provided at the connecting portion 256. A female thread, which screwingly engages with a male thread formed at the shaft 204, is formed at the tube portion 258.

At one end portion of the shaft 204, a sprocket 259 is coaxially attached, and a belt 260 is wound therearound. The belt 260 is also wound round a sprocket 262, which is attached at a rotating shaft 206A of a pulse motor 206. Consequently, driving force of the pulse motor 206 (rotation of the rotating shaft 206A) can be transmitted to the shaft 204 via the belt 260, and a rotation speed of the shaft 204 can be controlled by a rotation speed of the pulse motor 206.

Figure 3:
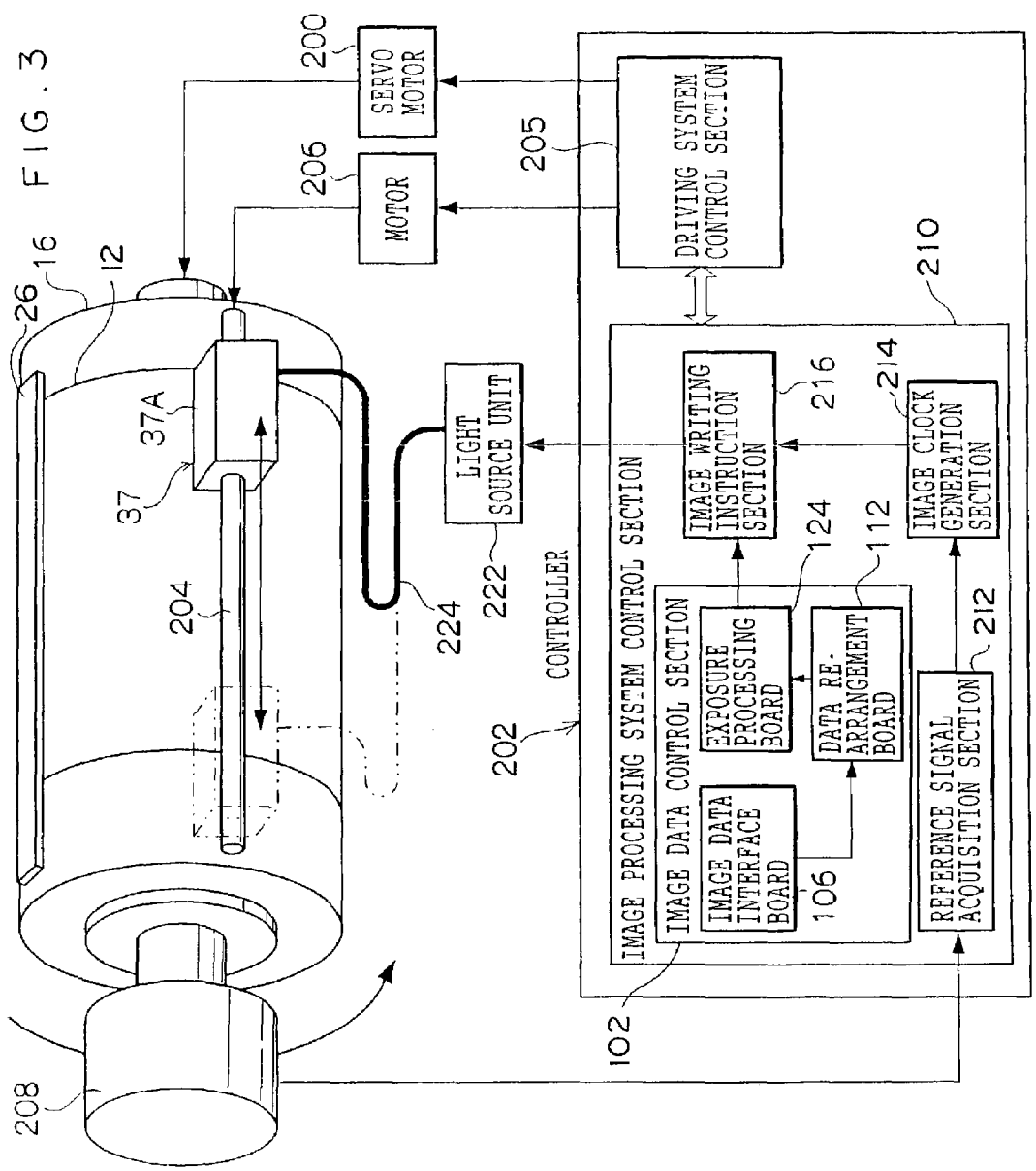
FIG. 3 is a block view showing schematics of a controller for driving a rotating drum and the recording head.

As shown in FIG. 3, the recording head main body 37A is positioned at a home position, which is a position separated from the peripheral surface at one axial direction end of the rotating drum 16. The recording head main body 37A is moved in the axial direction of the rotating drum 16 by driving force of the pulse motor 206. Thus, the recording head main body 37A moves for sub-scanning.

Consequently, the recording head main body 37A moves along the shaft 204 (sub-scanning) in accordance with rotation of the rotating drum 16 (main scanning). Hence, an image is scanned and exposed at the printing plate 12 on the basis of image data.

When scanning exposure of the printing plate 12 has finished, the rotating drum 16 is temporarily stopped at a position at which the trailing end chuck 36 retaining the trailing end of the printing plate 12 faces the trailing end chuck attaching/removing unit 32, and the trailing end chuck 36 is removed from the rotating drum 16. Consequently, the trailing end of the printing plate 12 is released.

Then the rotating drum 16 is rotated in the direction for removal of the printing plate 12. Thus, the printing plate 12 is discharged, from a trailing end side thereof, along a tangential direction of the rotating drum 16 to the plate ejection guide 22 of the conveyance guide unit 18. Thereafter, the printing plate 12 is ejected to a developing device for subsequent processes.

FIG. 3 shows a control system for rotation of the rotating drum 16, movement of the recording head section 37, and image recording by the recording head section 37 on the basis of image signals.

The rotating drum 16 is rotated by driving force of a servo motor 200. A rotation speed of the servo motor 200 is controlled on the basis of driving signals from a driving system control section 205 of a controller 202.

As shown in FIG. 2, the shaft 204, at which the male thread of the ball-screw mechanism is formed, is axially rotated by the pulse motor 206, and thus the recording head section 37 is moved in the axial direction of the rotating drum 16. A driving speed of the pulse motor 206 is controlled on the basis of driving signals from the driving system control section 205 of the controller 202.

A rotary encoder 208 is coaxially attached at a shaft portion at an axial direction one end portion of the rotating drum 16.

Pulse signals from the rotary encoder 208, which correspond with the rotation speed of the rotating drum 16, are transmitted to a reference signal acquisition section 212, which structures part of an image processing system control section 210 at the controller 202.

The reference signal acquisition section 212 is connected to an image clock generation section 214. When an image clock is to be generated, the image processing system control section 210 generates an image clock which is incremented, on the basis of the rotation of the rotating drum 16, at a main scanning commencement time or the like for each occurrence of a predetermined rotation (for example, one full turn). The image clock is transmitted to an image writing instruction section 216.

Image data corresponding to a number of lines that are required for main scanning at the same time is inputted to the image writing instruction section 216 from an exposure processing board 124 (described later) of an image data processing section 102, and this image data is transmitted to a light source unit 222 at predetermined timings.

A plurality of light sources (laser diodes or the like) are provided at the light source unit 222. The light from each light source is guided to the recording head section 37 through optical fiber 224.

The image writing instruction section 216 controls the recording head section 37, and an image is recorded at the printing plate 12 by irradiation of a light beam, which is modulated on the basis of the inputted image signals, onto the printing plate 12, rotation of the rotating drum 16 (main scanning), and movement of the recording head section 37 (sub-scanning).

Operations of the printing plate automatic exposure device 150 are as follows.

The printing plate 12 on the plate supply guide 20 is fed to the rotating drum 16, and a leading end portion of the printing plate 12 is retained by the leading end chuck 26. In this state, the rotating drum 16 rotates and the printing plate 12 is tightly wound onto the peripheral surface of the rotating drum 16. Thereafter, the trailing end of the printing plate 12 is retained by the trailing end chuck 36, and thus preparation for exposure is completed.

In this state, image data is read in and exposure processing by the light beam from the recording head section 37 is begun. This exposure processing is "scanning exposure", in which the recording head section 37 moves in the axial direction of the rotating drum 16 while the rotating drum 16 rotates at high speed (main scanning).

When the exposure processing has finished, the conveyance guide unit 18 switches (the plate ejection guide 22 is made to correspond with the rotating drum 16), and then the printing plate 12 wound on the rotating drum 16 is ejected along the tangential direction. At this time, the printing plate 12 is fed to the plate ejection guide 22.

When the printing plate 12 has been fed to the plate ejection guide 22, the conveyance guide unit 18 switches, the plate ejection guide 22 is made to correspond with an ejection port, and the printing plate 12 is ejected. A developing section is provided along this direction of ejection, and the printing plate 12 continues on to undergo development processing.

Figure 4:
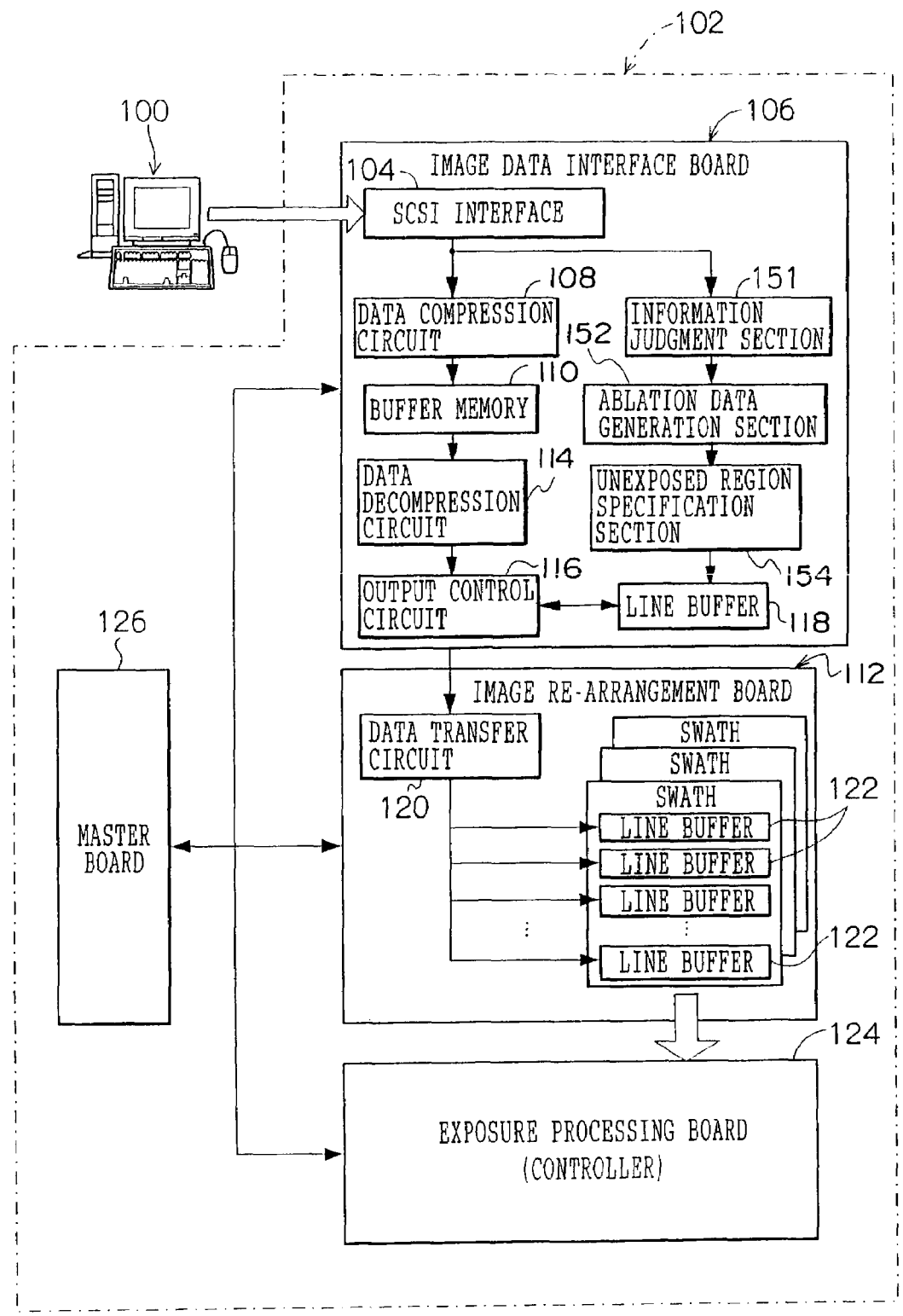
FIG. 4 is a schematic structural diagram of an image recording processing system relating to the present embodiment.

FIG. 4 shows an image recording processing system including the image data processing section 102 which structures a portion of the controller 202 of the printing plate automatic exposure device 150.

This image recording processing system is structured by a PC 100 and the image data processing section 102, which is connected to the PC 100. The PC 100 generates image data and serves as an external control device for implementing editing and the like.

The PC 100 may be a stand-alone personal computer, and may be connected to a network. Transmission from the PC 100 to the image data processing section 102 of job data, which includes description information (described later) required for image recording, is carried out via a SCSI interface 104. The SCSI interface 104 is incorporated as a portion of an image data interface board 106 of the image data processing section 102.

Of the job data acquired via the SCSI interface 104, image data is transmitted to a data compression circuit 108, and compression processing is executed. ALDC (adaptive lossless data compression) is commonly used as a compression format. Alternatively, other compression formats such as JPEG and the like are also available.

The image data that has been compressed by the data compression circuit 108 is stored and accumulated at a buffer memory 110.

The image data accumulated at the buffer memory 110 is transmitted to a data decompression circuit 114. The compressed image data is decompressed at the data decompression circuit 114, and is supplied to an output control circuit 116. A line buffer 118 is connected to the output control circuit 116. At the line buffer 118, the decompressed image data is edited to image data so as to conform to main scans at a time of scanning from the image data processing section 102. That is, the image data is rearranged to line image data.

Meanwhile, of the acquired job data, the description information required for image-recording is inputted to an information judgment section 151, and judgment of the description information is carried out. The description information includes plate information (a plate size, plate type, thickness and the like), punching information (type of punch, punching position offset and the like) and exposure range information (an exposure position main scanning offset, an exposure position sub-scanning offset, a main scanning exposable size, a sub-scanning exposable size and the like). On the basis of this information, hardware settings (positioning of the printing plate 12, the punching position, a position of the trailing end chuck 36 and the like) and software settings (corresponding to a range of scanning by the recording head main body 37A) are established.

Herein, the line buffer 118 is connected to an ablation data generation section 152 via an unexposed region specification section 154. As description information, the plate type of the plate information and the exposure range information are inputted to the ablation data generation section 152 from the information judgment section 151. If the plate type is judged to be a positive type, ablation data is generated in accordance with the acquired job data, as homogeneous job data based on the exposure range information.

Below, a description for this embodiment is given, in which it is presumed that the printing plate 12 is a positive-type printing plate, and that ablation data to serve as predetermined-color data is to be appended at a region 12B other than an image region 12A.

Figure 5:
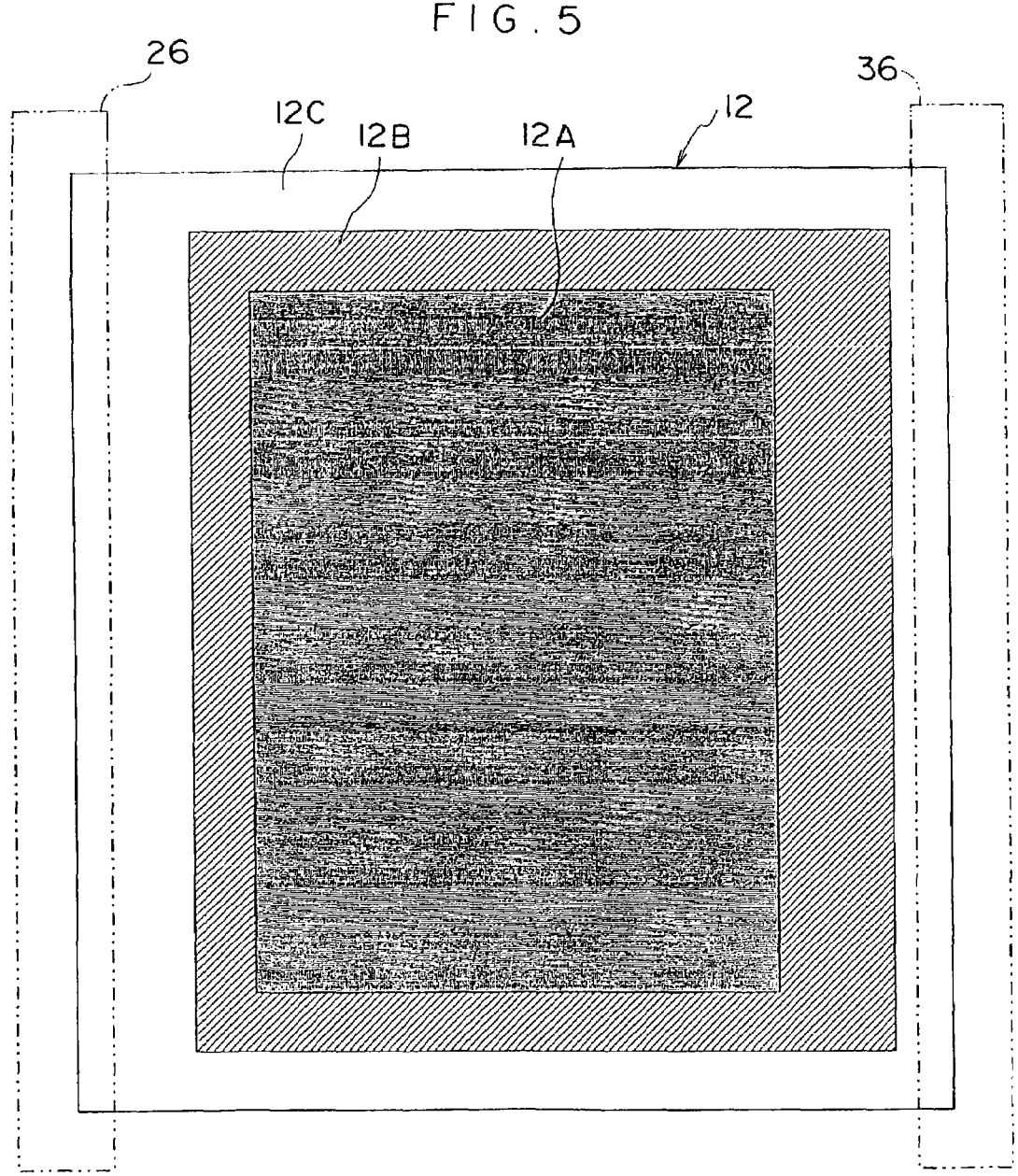
FIG. 5 is a plan view showing an image region, an ablation region and an unexposed region of a printing plate.

The ablation data is data of a single predetermined color. As shown in FIG. 5, the ablation data is data for exposing the region 12B other than the image region 12A at the printing plate 12 to be "solid". When such data is appended, exposing light is irradiated for 100% density.

At the unexposed region specification section 154, a non-exposure region 12C is provided at a border at an outermost periphery of the region for which the generated ablation data is appended, that is, at a peripheral edge of the printing plate 12.

This non-exposure region 12C is a region which coincides with the leading end chuck 26 and the trailing end chuck 36, which are for retaining the printing plate 12 at the printing plate automatic exposure device 150, and is a region which coincides with clear data regions at scanning commencement and scanning completion in a case of interlaced scanning. Furthermore, the non-exposure region 12C is a region which coincides with a punching position at which a hole is formed by the puncher 24 shown in FIG. 1.

If ablation data is added at these portions, light could be incident on the leading end chuck 26 and the trailing end chuck 36, causing damage to the leading end chuck 26 and trailing end chuck 36 or disorderly reflections, stripe-like irregularities could be caused at scanning commencement and completion, and conflicts with clear-data for interlaced scanning could occur. Furthermore, light could pass through a punched hole and be directly incident on the rotating drum 16. Accordingly, in the present embodiment, when ablation data is to be added, the ablation data is generated such that peripheral edge portions of the printing plate 12 are in the non-exposure region 12C.

The generated ablation data is added to the line image data that has been rearranged at the line buffer 118, and is supplied to the output control circuit 116.

The line image data is transmitted from the output control circuit 116 to a data transfer circuit 120 of a data re-arrangement board 112.

Because the image data processing section 102 of the present embodiment is structured for scanning a plurality of lines in one cycle of main scanning and this line scanning is interlaced scanning, the sequence of the line image data is different from the sequence of the data supplied from the output control circuit 116 of the image data interface board 106.

Accordingly, at the data re-arrangement board 112, line image data that is required for one cycle of main scanning is sorted out, and an arrangement thereof is controlled. This data is stored at a plurality of line buffers 122. Each of the plurality of line buffers 122 is capable of storing image data in an amount corresponding to one line. When the line image data has been sorted out to the plurality of line buffers 122, one cycle of main scanning can be carried out by the exposure processing board 124.

In the present embodiment, line image data of the number of lines required for one cycle of main scanning is referred to as a swath. The data re-arrangement board 112 is capable of accumulating line image data for three swaths.

The image data interface board 106, the data re-arrangement board 112 and the exposure processing board 124 are controlled by a master board 126.

Next, operation of the present embodiment will be described.

Figure 6A:
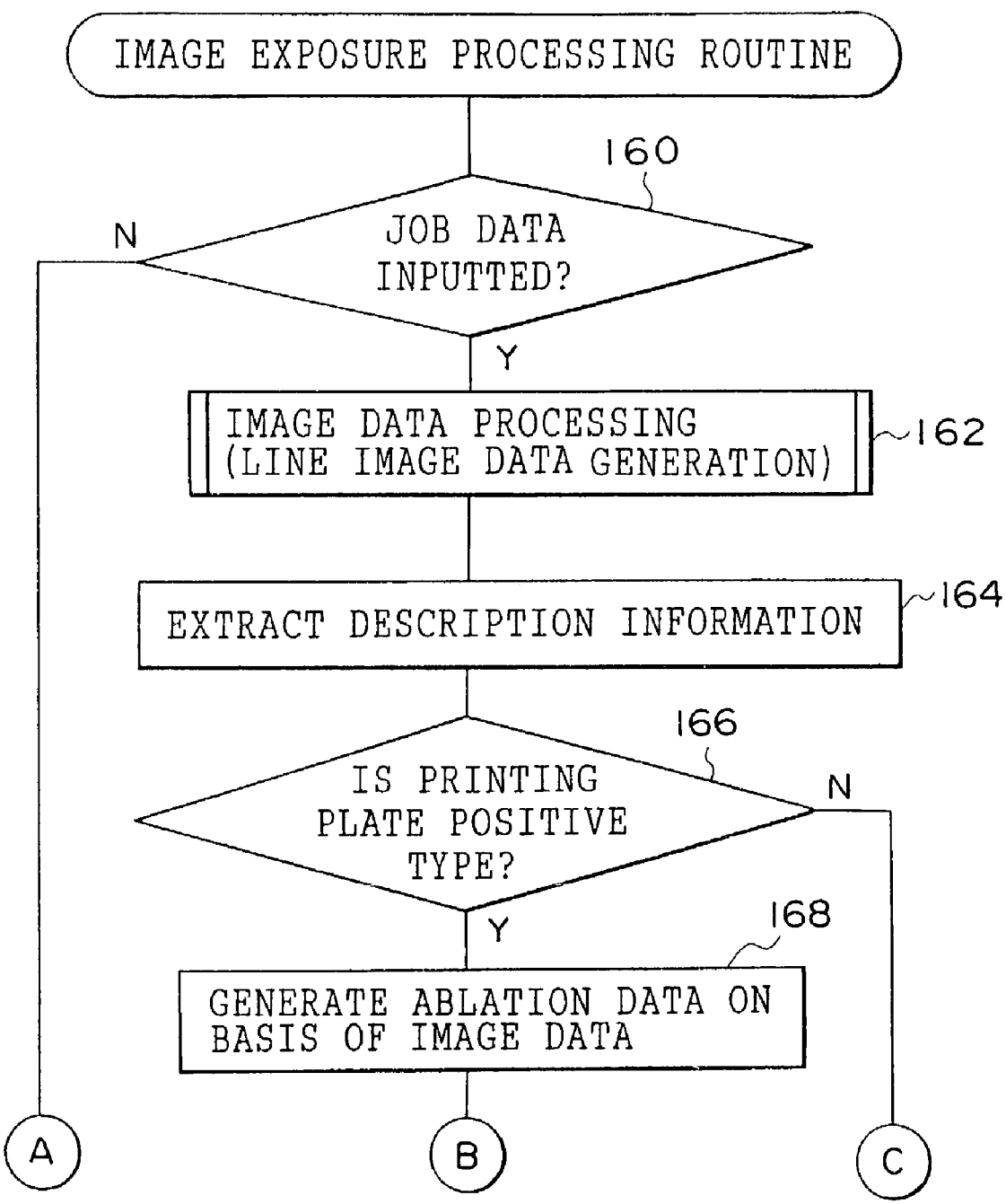
FIGS. 6A and 6B is a control flowchart showing operation of the printing plate automatic exposure device, including generation of ablation data.
Figure 6B:
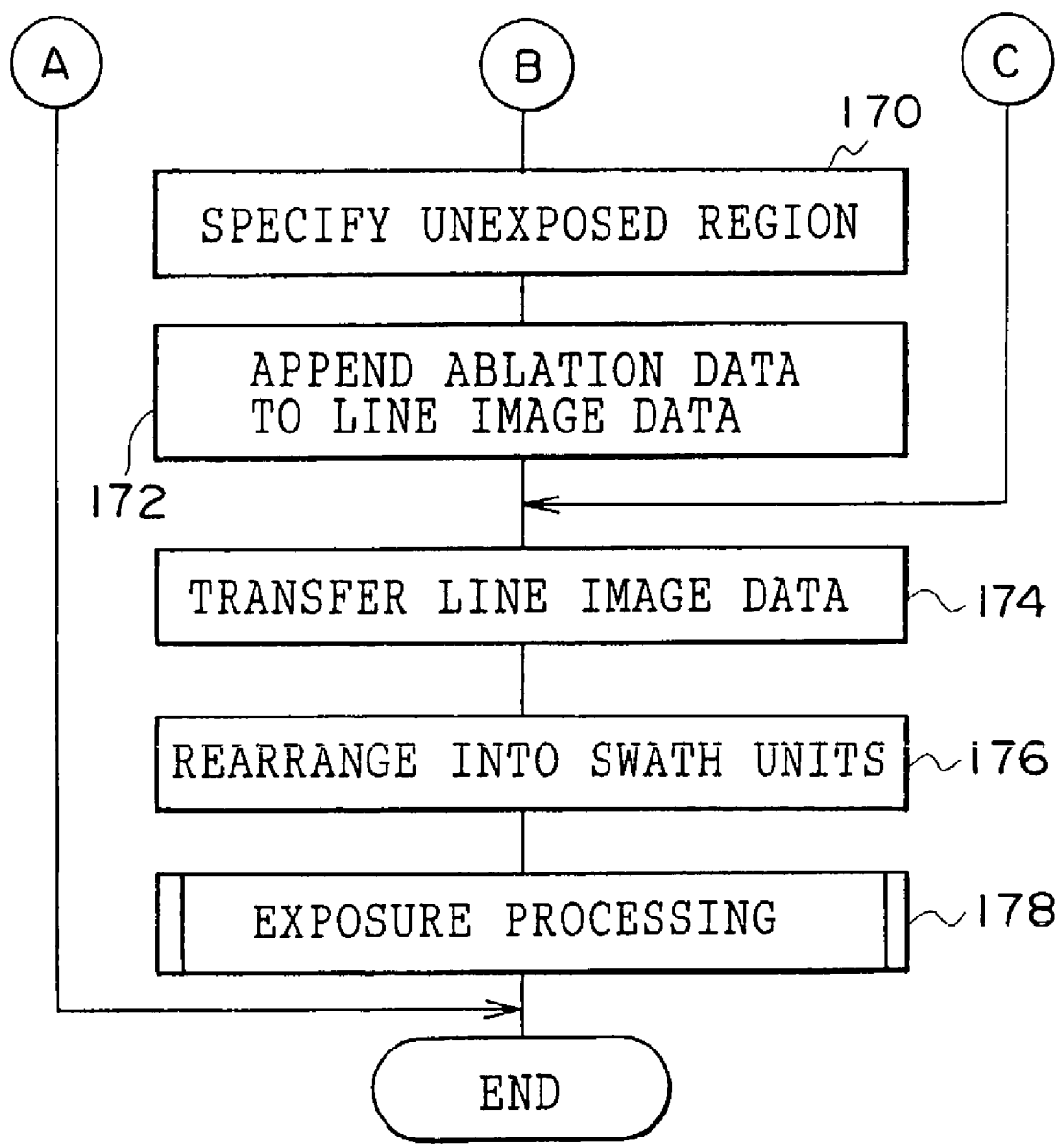

Flow of the job data inputted from the PC 100 will be illustrated in accordance with the flowchart of FIGS. 6A and 6B.

In step 160, it is determined whether or not job data has been inputted from the PC 100 via the SCSI interface 104. If the judgment in step 160 is positive, the routine advances to step 162 and executes image data processing.

For the image data processing, first, the image data is compressed in a predetermined compression format at the data compression circuit 108 of the image data interface board 106, and is stored and accumulated at the buffer memory 110.

The buffer memory 110 is capable of accumulating image data in amounts corresponding to tens or hundreds of lines. Consequently, the image data is supplied through the data decompression circuit 114 smoothly.

At the data decompression circuit 114, the image data that was compressed at the data compression circuit 108 is decompressed. At the output control circuit 116, the image data is converted to line image data, using the line buffer 118 as a working area.

In a next step 164, description information in the job data is extracted. Specifically: the description information that is required for image recording is inputted to the information judgment section 151; a plate size, plate type, thickness and the like are extracted from plate information; a punching type, punching position offset and the like are extracted from punching information; and an exposure position main scanning offset, exposure position sub-scanning offset, main scanning exposable size, sub-scanning exposable size and the like are extracted from scanning range information. On the basis of this extracted information, settings are achieved for both hardware and software.

In a subsequent step 166, it is determined from the extracted description information whether or not the printing plate 12 is of a positive type. If this judgment is positive, then it is determined that ablation data will be required, the routine advances to step 168, and ablation data is generated on the basis of the image data. That is, ablation data is generated so as to make the region 12B outside the image region 12A on the printing plate 12 solid.

In a subsequent step 170, the non-exposure region 12C at peripheral edge portions of the printing plate 12 is formed in the generated ablation data.

As a result of this specification of an unexposed region, the incidence of direct light at the leading end chuck 26 and trailing end chuck 36 is prevented. Thus, the leading end chuck 26 and trailing end chuck 36 themselves are protected, diffuse reflection of light that is irradiated at the leading end chuck 26 or trailing end chuck 36 is prevented, and adverse effects of diffused reflections at image exposure regions of the printing plate 12 are prevented. Furthermore, because the punched hole is avoided, direct incidence of light on the rotating drum 16 is prevented.

Further, there is no occurrence of conflicts with clear-data specified in software in a case of interlaced scanning. Further again, there is no occurrence of the stripe-form irregularity in cases of interlaced scanning.

In a subsequent step 172, the ablation data featuring the unexposed portions is generated at the line buffer 118 of the image data interface board 106, and added to the line image data. Then the routine advances to step 174. Note that if the determination of step 166 is negative (a judgment that the printing plate 12 is not a positive type), the routine advances directly from step 166 to step 174.

In step 174, the line image data to which the ablation data has been appended is transmitted to the data transfer circuit 120 of the data re-arrangement board 112.

The line image data is transmitted to the data re-arrangement board 112 in sequence, arrangement of the line image data into swath units according to the format of main scanning of the image-recording device is executed, and the line image data is stored at the respective line buffers 122 (step 176).

When line image data in an amount corresponding to three swaths is sorted out, the line image data is transmitted from the data re-arrangement board 112 to the exposure processing board 124 in amounts which each correspond to one cycle of main scanning (one swath) from the respective line buffers 122. At the exposure processing board 124, image processing is executed on the basis of one-swath units of image data (step 178).

In the present embodiment as described above, ablation data of the region 12B other than the image region 12A, which is required at the printing plate 12 of a positive type, is appended at the printing plate automatic exposure device 150 side. Therefore, a problem with a transmission time of job data from the PC 100 being slowed because of the ablation data is resolved. As a result, image-recording operations can be made more efficient. Furthermore, because this ablation data is provided with the non-exposure region at a region corresponding to peripheral edge portions of the printing plate 12, light does not impact on the leading end chuck 26, the trailing end chuck 36 and the like, and the ablation data can be made compatible with interlaced scanning.

In the present embodiment, in a case in which the printing plate 12 is a positive type, the region 12B outside the image region 12A is the object of the ablation data added at the printing plate automatic exposure device 150 side. However, predetermined-color data may be prepared with the region 12B as an object with the printing plate 12 being a negative type. In such a case, the ablation data generation section 152 in the image data interface board 106 of FIG. 4 is substituted with a predetermined-color data generation section, and other functional blocks of the image data interface board 106 are not altered.

That is, as described for the above embodiment, the predetermined-color data corresponds to ablation data in cases in which the printing plate 12 is a positive type, and is "solid" color data.

Alternatively, if, for example, a base color of a recording medium (printed matter) to be printed by the printing plate 12 is not white, then it is conceivable that a region of the printed medium corresponding to the region 12B other than the image region 12A may be desired to be white, or another desired color. That is, surroundings of the printing plate 12 correspond to a frame and, in view of design or as a means for presenting an image positively, it may be required that these surroundings are changed to any of various colors different from the base color of the printed matter. Accordingly, regardless of whether the printing plate 12 is a positive type or a negative type, a desired color may be applied to the printed matter corresponding to the region 12B other than the image region 12A by appending predetermined-color data, without increasing the burden of data transmission.

What is claimed is:

1. An image data control apparatus to be employed at a laser image-recording device which forms an image on a printing plate on the basis of image data from an external device, the image data control apparatus for the image-recording device comprising:

a judgment section which judges whether the printing plate is a negative type or a positive type of printing plate;

an image region identification section which, in a case in which the judgment section judges that the printing plate is a positive type, identifies an image region on the printing plate on the basis of the image data from the external device; and an ablation data addition section, which adds ablation data to the image data for ablation of a region on the printing plate other than the image region identified at the image region identification section.

2. The image data control apparatus for a laser image-recording device of claim 1, wherein the ablation data is provided with a non-exposure portion at a portion corresponding to a peripheral edge region of the printing plate.

3. An image data control apparatus to be employed at a laser image-recording device which forms an image on a printing plate on the basis of image data from an external device, the image data control apparatus for the laser image-recording device comprising:

a predetermined-color data addition section, which adds predetermined-color data to the image data for coloring a region on the printing plate other than an image recording region with a predetermined color, wherein the predetermined-color data is provided with a non-exposure portion at a portion corresponding to a peripheral edge region of the printing plate.

4. The image data control apparatus for a laser image-recording device of claim 3, wherein the predetermined-color data comprises ablation data.

5. An image data control method to be employed at a laser image-recording device for exposing a printing plate to radiation, the method comprising:

determining whether or not job data has been inputted;

compressing the image data in a predetermined compression format and storing the compressed image data at a buffer memory;

decompressing the compressed image data and converting the decompressed image data to line image data;

extracting description information in the job data and achieving settings for both hardware and software on the basis of this extracted information;

determining from the extracted description information whether or not the printing plate is of a positive type and if this judgment is positive, then determining that ablation data will be required and generating ablation data on the basis of the image data;

forming non-exposure regions at peripheral edge portions of the printing plate in the generated ablation data and adding the ablation data featuring the unexposed portions to the line image data;

arranging the line image data into swath units according to the format of main scanning of the image-recording device and storing the line image data at the respective line buffers; and executing image processing on the basis of one-swath units of image data, when line image data in an amount corresponding to three swaths is sorted out.

6. The image data control method for a laser image-recording device of claim 5, wherein the description information comprises plate information, punching information, and scanning range information.

7. The image data control method for a laser image-recording device of claim 6, wherein the plate information comprises a plate size, plate type, and thickness.

8. The image data control method for a laser image-recording device of claim 6, wherein the punching information comprises a punching type and punching position offset.

9. The image data control method for a laser image-recording device of claim 6, wherein the scanning range information comprises an exposure position main scanning offset, exposure position sub-scanning offset, main scanning exposable size, and sub-scanning exposable size.

10. The image data control method for a laser image-recording device of claim 5, wherein the step for generating the ablation data generates the ablation data so as to make the region outside the image region on the printing plate solid.

* * * * *